R. M. RUSSELL.
DRILL CHUCK.
APPLICATION FILED APR. 19, 1909.
1,018,008.
Patented Feb. 20, 1912.
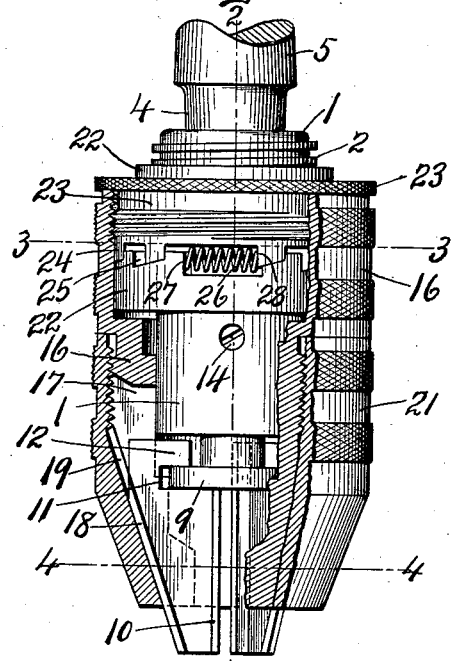
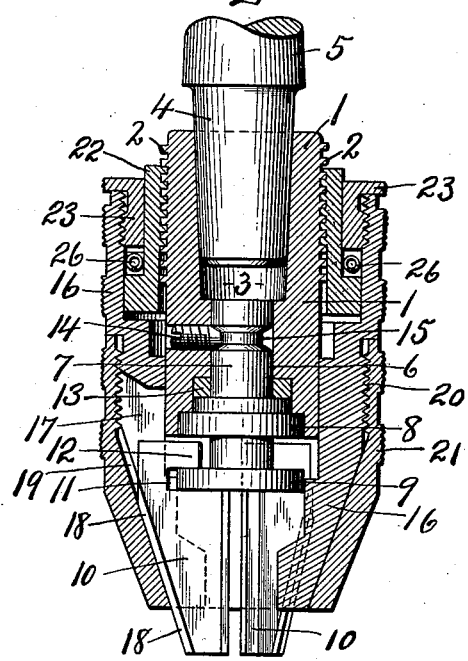
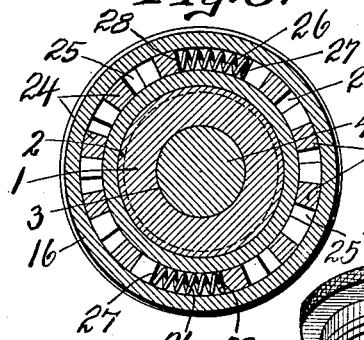
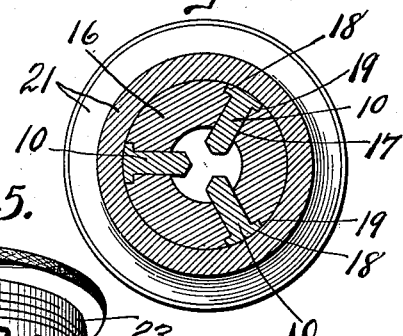
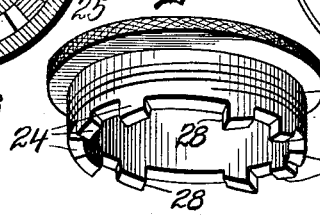
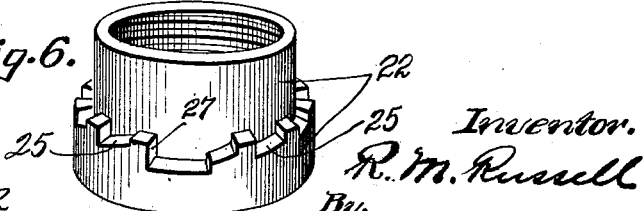
Witnesses.
A. C. Thomas
H. E. Chace
Inventor.
R. M. Russell
By Howard P. Denison
Attorney.

UNITED STATES PATENT OFFICE.

ROSS M. RUSSELL, OF BINGHAMTON, NEW YORK, ASSIGNOR TO RUSSELL ANTI-FRICTION DRILL CHUCK COMPANY, OF ELMIRA, NEW YORK.

DRILL-CHUCK.

1,018,008.  Specification of Letters Patent.  Patented Feb. 20, 1912.

Application filed April 19, 1909. Serial No. 490,847.

*To all whom it may concern:*

Be it known that I, Ross M. RUSSELL, of Binghamton, in the county of Broome, in the State of New York, have invented new and useful Improvements in Drill-Chucks, of which the following, taken in connection with the accompanying drawings, is a full, clear, and exact description.

This invention relates to certain improvements in drill chucks involving the use of radially movable tapering jaws and means for opening and closing said jaws upon the shank of the drill or bit. When the jaws are firmly clamped upon the shank of the drill and the device used for drilling or similar purposes, the jaws become firmly set upon the drill to such an extent as to render operation of the jaw releasing mechanism extremely difficult owing to excessive friction of the screw.

My object is to provide a simple means whereby the jaws, however rigidly or firmly set upon the drill shank, may be easily and instantly released by a slight turn of the sleeve which controls their opening and closing movement.

Other objects and uses relating to specific parts of the device will be brought out in the following description:

In the drawings—Figure 1 is an elevation partly in section of my improved drill chuck. Figs. 2, 3 and 4 are respectively a longitudinal section and transverse sectional views taken on lines 2—2, 3—3 and 4—4, Fig. 1. Figs. 5 and 6 are perspective views of the detached cam sections of the sleeve.

In carrying out the object stated I provide a tubular head —1— having one end threaded exteriorly at —2— and provided with a tapering socket —3— in which is fitted a tapering shank —4— of a rotary drill spindle —5—. The opposite or lower end of the head —1— is formed with a central cylindrical opening —6— in which is loosely mounted for independent rotation a spindle —7— having enlarged flanges —8— and —9— spaced apart forming an intervening annular groove for receiving portions of a series of, in this instance, three wedge-shape jaws —10—. That is, the inner edges of the jaws —10— near their inner ends are formed with laterally extending grooves —11— which receive the flange —9—, said jaws being also formed with shoulders —12— which enter the intervening groove between the flanges —8— and —9— so that the jaws are locked against endwise movement relatively to the spindle —7— and head —1— to the flange —9—, although said jaws are free to rotate around or relatively to said flanges —8— and —9— and head —1—.

The outer or lower end of the central opening —6— is somewhat enlarged for receiving a hardened wearing ring —13— which is engaged by the base of the flange —8—, which is also hardened to reduce end thrust friction as much as possible without the use of anti-friction rollers or balls.

The spindle —7— and flanges —8— and —9— forming a part thereof are held against endwise movement relatively to the head —1— by means of a stop screw —14— which enters an annular groove —15— in the spindle —7— and permits said spindle to rotate relatively to the head —1—.

A sleeve —16— is rotatably fitted and mounted upon the head —1— below the threaded portion —2— and is provided at its lower end with a series of, in this instance three, radial slots —17— in which are slidably fitted the jaws —10—, said jaws having their outer longitudinal edges tapered and provided with lengthwise ribs —18— which fit in lengthwise grooves or ways —19—, the latter forming lateral enlargement of the outer sides of the slots —17— to hold the jaws against undue inward movement, the outer faces of the jaws being substantially coincident with the periphery of the adjacent portion of the sleeve —16—.

The central portion of the sleeve —16— is threaded exteriorly at —20— and is engaged by an internally threaded sleeve —21— having a tapering lower end conforming to the outer tapering faces of the jaws with which it is engaged to hold said jaws in operative position or against outward displacement and at the same time affording additional ways along which the jaws slide in opening and closing the same. The interior diameter of the upper end of the sleeve —16— is somewhat larger than the external diameter of the head —1— for receiving an internally threaded sleeve section —22— and an additional externally threaded sleeve section —23—, the latter being screwed into the upper internally threaded end of the sleeve section —16—, as best seen in Figs. 1 and 2. The threaded portion of the sleeve section —23— is, therefore, interposed between the sections —16— and —22— and when screwed down upon the section —16— is firmly locked thereto, but is fitted somewhat loosely upon the upper end of the section —22—, so as to turn freely thereon. The section —16— is also fitted with an easy fit upon the lower end of the section —22— and both of the sections —16— and —23— are permitted to have a limited rotary and axial movement relatively to the section —22— for a purpose presently described.

The inner end of the sleeve section —23— and underlying portion of the threaded section —22— are provided with one or more, in this instance a plurality of, intermeshing tongues —24— and grooves —25—, the grooves being somewhat longer circumferentially than the tongues so as to permit a limited rotary movement of the sleeve sections —16—, —21— and —23— relatively to the sleeve section —22—. The bases of the grooves —25— and preferably the inner ends of the tongues —24— are beveled or inclined in one direction so as to permit a slight endwise movement of the said sleeve sections —16—, —21— and —23— relatively to the sleeve section —22— during such rotation in one direction, said sleeve sections —16—, —21— and —23— being forced in the opposite direction by one or more, in this instance two, springs —26— as best seen in Figs. 1 and 3. Each of the springs —26— is interposed between a shoulder —27— on the sleeve section —22— and an opposed shoulder —28— on the sleeve section —23— and serves to yieldingly hold the sleeve sections —16—, —21— and —23— in one position with the tongues —24— in engagement with one side of the grooves —25— as clearly shown in Fig. 1.

The interlocking tongues and grooves —24— and —25—, aside from affording a limited movement of the sleeves —16—, —21— and —23— relatively to the sleeve section —22—, serve to transmit rotary motion to the section —22— as the sleeve sections —16—, —21— and —23— are rotated by hand, thereby screwing the section —22— in one direction or the other, as may be desired, upon the head —1— to tighten or loosen the jaws —10— upon the drill.

The tongues —24— are normally held in engagement with the right hand ends of the grooves —25— by the springs —26—, and by rotating the sleeve sections —16—, —21— and —23—, by hand to the right, the sleeve section —22—, together with the other sleeve sections just mentioned, are forced upwardly thereby bringing the lower tapering end of the sleeve section —21— against the outer faces of the jaws and moving the latter inwardly to close the same upon the drill spindle or other article adapted to be gripped by the jaws.

Now assuming that the drill has been used for drilling purposes and has become firmly set in the jaws, and that after the drilling is completed it is desired to remove the drill, then by grasping the sleeve sections —16— and —21— by hand and turning them slightly to the left, such sleeve sections, together with the sleeve section —23—, may be rotated a limited distance determined by the relative widths of the grooves —25— and interfitting tongues —24— against the action of the springs —26— and relatively to the sleeve section —22— without rotating the latter, thus causing the tongues —24— to ride down the inclined bases of the grooves —25— and allowing the sleeve sections —16—, —21— and —23— to move downwardly by their own gravity assisted by a slight pull of the hand upon the sleeves during the limited rotation, thereby relieving the pressure of the tapering end of the section —21— upon the tapering faces of the jaws and thus freeing the jaws from holding engagement upon the drill, whereupon the further rotation of the sleeves by hand will cause the sleeve section —22— to be unscrewed to additionally move the sleeve sections downwardly and further release the jaws, and as soon as such rotation of the sleeve ceases by withdrawing the hand therefrom, the springs —26— return the sleeve sections —16—, —21— and —23— to their normal positions with the tongues —24— in engagement with the right hand ends of the grooves —25—, thereby causing a slight elevation of the sleeve sections —16—, —21— and —23— relatively to the section —22—.

It is now clear that the flange —9— not only constitutes a means for holding the jaws against endwise movement relatively to the head —1—, but together with the spindle —7— of which it forms a part, rotates with said jaws independently of the head —1—, while the sleeves are being rotated to finally tighten the jaws upon the work, or more particularly during the initial movement of the sleeves to loosen the jaws, thereby avoiding excessive friction between the jaws and flange —9— while the jaws are being finally tightened or loosened upon and from the drill, the hardened end thrust bearing surfaces of the washer —13— and adjacent end of the flange —8— serving to minimize the friction incidental to the independent rotation of the jaw locking member —9—.

The screw threaded sleeve section —22— coacting with the threaded portion of the head —1— constitutes one means for moving the tapering sleeve —21— endwise to open and close the jaws while the interlocking tongues and grooves of the sleeve sections —22— and —23— constitute auxiliary means for effecting the endwise movement of the tapering sleeve —21— to release the jaws independently of the rotation of the sleeve section —22—, and although I have shown a plurality of such tongues and grooves having beveled contact faces, it is evident that a single tongue and groove having beveled contact faces will perform the same function in conjunction with suitable means for returning the sleeve section —23— to its normal position.

What I claim is—

1. In a drill chuck, a threaded head, a threaded sleeve engaging the threaded portion of the head, a spindle journaled in the head and provided with an annular flange, radially movable jaws engaging opposite faces of said flange, means for holding the spindle against endwise movement, a separate sleeve rotatably mounted on the first named sleeve and movable endwise thereof, one of the sleeves having an inclined bearing engaged by the other sleeve for moving the second sleeve axially as it is rotated, means actuated by said axial movement of the second sleeve for moving the jaws radially, and means for limiting the degree of rotation of the second sleeve relatively to the first named sleeve.

2. In a drill chuck, a rotary head, radially movable jaws operatively connected to the head, a rotary tapering sleeve engaging the jaws and movable axially, means brought into action by the rotation of the sleeve in one direction for moving said sleeve axially to open the jaws, an additional sleeve secured to the first named sleeve and engaging the outer edges of said jaws, and additional means for automatically rotating the first named sleeve in the opposite direction a limited distance.

3. In a drill chuck, a rotary threaded head, a threaded sleeve engaging the threaded portion of the head, an annular flange rotatably mounted on the head, means for holding the flange against endwise movement, radially movable jaws engaging the inner and outer faces of the flange, a second sleeve rotatably mounted on the head and having a limited rotary movement relatively to the first named sleeve, means for limiting such relative rotary movement, means brought into action by the limited rotary movement of the second sleeve relatively to the first sleeve for moving the second sleeve axially relatively to the jaws, and means actuated by said axial movement of the second sleeve for moving the jaws radially.

4. In a drill chuck, a rotary threaded head, a threaded sleeve engaging the threaded head and rotatable thereon, a spindle journaled in the head and provided with an annular flange, means for holding the spindle against endwise movement, radially movable jaws engaging the inner and outer faces of the flange, a second sleeve rotatable on the head, interlocking connections with a lost motion between the two sleeves whereby the second sleeve has a limited rotary movement relatively to the first named sleeve, said connections including means for moving the second sleeve axially relatively to the first named sleeve as the second sleeve is rotated relatively thereto, and means carried by the second sleeve for moving the jaws radially as said second sleeve is rotated.

5. In a drill chuck, a threaded head, a rotary threaded sleeve section engaged with the threaded head, a second sleeve section rotatable relatively to the first sleeve section, said sleeve sections being provided with an interfitting tongue and groove, the groove being somewhat wider circumferentially than the tongue to allow a limited rotary movement of the second sleeve section relatively to the first sleeve section in one direction, means for forcing the second sleeve section in the opposite direction, said tongue and groove having inclined contact faces whereby the second sleeve is moved endwise during its limited rotation, a third sleeve section rigidly connected to the second sleeve section and provided with radial slots, jaws movable in said slots, means on the head for holding the jaws against endwise movement relatively thereto, and a tapering sleeve section secured to the third sleeve section and engaging the outer edges of the jaws for moving the latter radially as the sleeve sections are moved axially.

In witness whereof I have hereunto set my hand this 15th day of April, 1909.

ROSS M. RUSSELL.

Witnesses:
 H. E. CHASE,
 J. M. HOES.

Copies of this patent may be obtained for five cents each, by addressing the "Commissioner of Patents, Washington, D. C."